(12) United States Patent
Nebergall et al.

(10) Patent No.: US 8,833,871 B2
(45) Date of Patent: Sep. 16, 2014

(54) SWEEPING TRACK SHOE FOR UNDERCARRIAGE SYSTEM IN A TRACK-TYPE MACHINE

(75) Inventors: Kenneth Nebergall, Canton, IL (US); Stephen Garnett, Princeville, IL (US); Britta A. Jost, Mackinaw, IL (US); Eric J. Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 844 days.

(21) Appl. No.: 12/967,608

(22) Filed: Dec. 14, 2010

(65) Prior Publication Data
US 2012/0146398 A1    Jun. 14, 2012

(51) Int. Cl.
*B62D 55/088*     (2006.01)
*B62D 55/28*      (2006.01)

(52) U.S. Cl.
CPC .............. *B62D 55/088* (2013.01); *B62D 55/28* (2013.01)
USPC ....................................................... 305/107

(58) Field of Classification Search
USPC ......... 305/108, 111, 100, 107, 110, 112, 114, 305/198, 201; 180/191
See application file for complete search history.

(56) References Cited

U.S. PATENT DOCUMENTS

| | | | |
|---|---|---|---|
| 2,637,603 A | 5/1953 | Cartlidge | |
| 3,035,872 A | 5/1962 | Rich | |
| 4,750,792 A | 6/1988 | Caron et al. | |
| 4,763,961 A | 8/1988 | Parrott | |
| 5,190,363 A | 3/1993 | Brittain et al. | |
| 5,226,703 A | 7/1993 | Norman | |
| 5,762,408 A | 6/1998 | Marsh | |
| 5,820,230 A | 10/1998 | Freeman | |
| 5,863,104 A | 1/1999 | Satzler | |
| 6,702,406 B2 | 3/2004 | Yoshida et al. | |
| 6,921,140 B2 | 7/2005 | Simons et al. | |
| 7,591,515 B2 | 9/2009 | Breton et al. | |
| 2009/0026836 A1 | 1/2009 | Maeda | |
| 2009/0200859 A1 | 8/2009 | Matthys | |

FOREIGN PATENT DOCUMENTS

| | | |
|---|---|---|
| JP | 06067277 | 9/1994 |
| JP | 8244658 | 9/1996 |
| JP | 10007038 | 1/1998 |
| JP | 2001138965 | 5/2001 |

*Primary Examiner* — Glenn Dayoan
*Assistant Examiner* — Melissa A Black

(57) ABSTRACT

A ground engaging track for a track-type machine includes a set of identical standard track shoes each having a relatively narrow shoe footprint, and a sweeping track shoe having a relatively wide shoe footprint. The sweeping track shoe is connectable via track links with the standard track shoes in an endless chain configuration such that the sweeping track shoe juts outwardly of the standard track shoes, for sweeping debris from a clearance between the track and a main frame of the track-type machine. The sweeping track shoe includes bolting apertures formed therein and communicating between an upper shoe surface and a ground contacting shoe surface, the bolting apertures being arranged in a directional link bolting pattern. The directional link bolting pattern defines a minor shoe axis and a major shoe axis, and the sweeping shoe body may be configured such that an inboard sweeping edge is spaced further than an outboard edge from the minor shoe axis.

19 Claims, 6 Drawing Sheets

SWEEPING TRACK SHOE FOR UNDERCARRIAGE SYSTEM IN A TRACK-TYPE MACHINE

TECHNICAL FIELD

The present disclosure relates generally to track-type machines, and relates more particularly to sweeping debris from a clearance between an undercarriage system and a main frame of a track-type machine by way of a sweeping track shoe.

BACKGROUND

Track-type machines are used in a wide variety of environments for a great many different tasks. The use of ground engaging tracks rather than wheels tends to impart better traction and durability. Construction, road building, forestry, mining, and landfills are common examples of track-type machine service environments. As will be familiar to many, machines used in such environments are commonly tasked with digging, distributing, compacting, and otherwise interacting with loose materials. As a result, track-type machines, and notably track-type tractors, often drive over and/or push through piles of loose material which can intrude into and/or be pushed on top of the track systems.

While track systems are typically ruggedly constructed to withstand the harsh conditions often encountered, engineers have recognized for many years that addressing the intrusion of debris into and among components of a track system in a track-type machine can extend service life. Rocks making their way between rotating components of a track system in the track chain itself are one example where mechanical stress and wear on track system components occurs. Idler recoil mechanisms are often used in ground engaging track systems to enable rocks and the like to pass through the track or be crushed without unduly stressing the components. In other instances, relatively soft material such as mud can become packed into components of the track system and have various deleterious consequences. Various strategies are known in which track chains and/or idlers and sprockets are shaped such that mud, etc., can be pushed out from among the track system components by way of track operation. Striker bars and the like have also been routinely mounted to track systems in an attempt to knock off debris stuck to the track. There is, however, ample room for improvement, as manual track and/or machine cleaning is still often necessary, and tends to be quite labor intensive.

SUMMARY OF THE DISCLOSURE

In one aspect, a sweeping track shoe is provided, for an undercarriage system in a track-type machine, where the undercarriage system includes a track roller frame and a ground engaging track having a plurality of standard track shoes defining standard shoe footprints, and the undercarriage system is configured to couple with a main frame of the track-type machine such that a clearance extends between the undercarriage system and the main frame. The sweeping track shoe includes a one-piece sweeping shoe body having bolting apertures formed therein and communicating between an upper shoe surface and a ground contacting shoe surface, and an outer perimeter defining a sweeping shoe footprint. The bolting apertures are arranged in a directional link bolting pattern defining a minor shoe axis and a major shoe axis. The sweeping shoe body further includes an outboard edge, an inboard sweeping edge, a leading edge and a trailing edge. The outboard edge is positioned at a first distance from the minor shoe axis and the inboard sweeping edge is positioned at a second distance from the minor shoe axis which is greater than the first distance. The sweeping track shoe is connectable with the standard track shoes in an endless chain configuration such that the sweeping track shoe juts outwardly of the standard track shoes for sweeping debris from the clearance during actuating the track.

In another aspect, a sweeping track shoe is provided, for an undercarriage system in a track-type machine, where the undercarriage system includes a track roller frame and a ground engaging track having a plurality of standard track shoes defining standard shoe footprints, and the undercarriage system is configured to couple with a main frame of the track-type machine such that a clearance extends between the undercarriage system and the main frame. The sweeping track shoe includes a one-piece sweeping shoe body having an outboard edge, an inboard sweeping edge, a leading edge and a trailing edge. The sweeping shoe body further includes bolting apertures formed therein and communicating between an upper shoe surface and a ground contacting shoe surface. The sweeping shoe body further includes a grouser which includes a portion of the ground contacting shoe surface and extends from the outboard edge to the inboard sweeping edge, and an outer perimeter defining a sweeping shoe footprint. The bolting apertures are arranged in a directional link bolting pattern defining a minor shoe axis intersecting the leading and trailing edges, and a major shoe axis intersecting the outboard and inboard edges. The link bolting pattern is symmetric about the minor shoe axis, and the sweeping shoe footprint is asymmetric about the minor shoe axis. The sweeping track shoe is connectable with the standard track shoes in an endless chain configuration such that the sweeping track shoe juts outwardly of the standard track shoes for sweeping debris from the clearance during actuating the track.

In still another aspect, a sweeping track shoe for an undercarriage system in a track-type machine includes a one-piece sweeping shoe body having a planate upper shoe surface, a ground contacting shoe surface, and an outer shoe perimeter defining a sweeping shoe footprint. The sweeping shoe body further includes a leading edge curving upwardly from the upper shoe surface, a trailing edge curving downwardly from the upper shoe surface, and a full width grouser including a portion of the ground contacting shoe surface. The sweeping shoe body further includes an outboard edge and an inboard edge, extending between the leading and trailing edges. The outboard edge defines a standard edge profile, and the inboard edge defines an anti-snagging edge profile and is configured for sweeping debris from a clearance between the undercarriage system and a main frame of the track-type machine.

DETAILED DESCRIPTION

Figure 1:
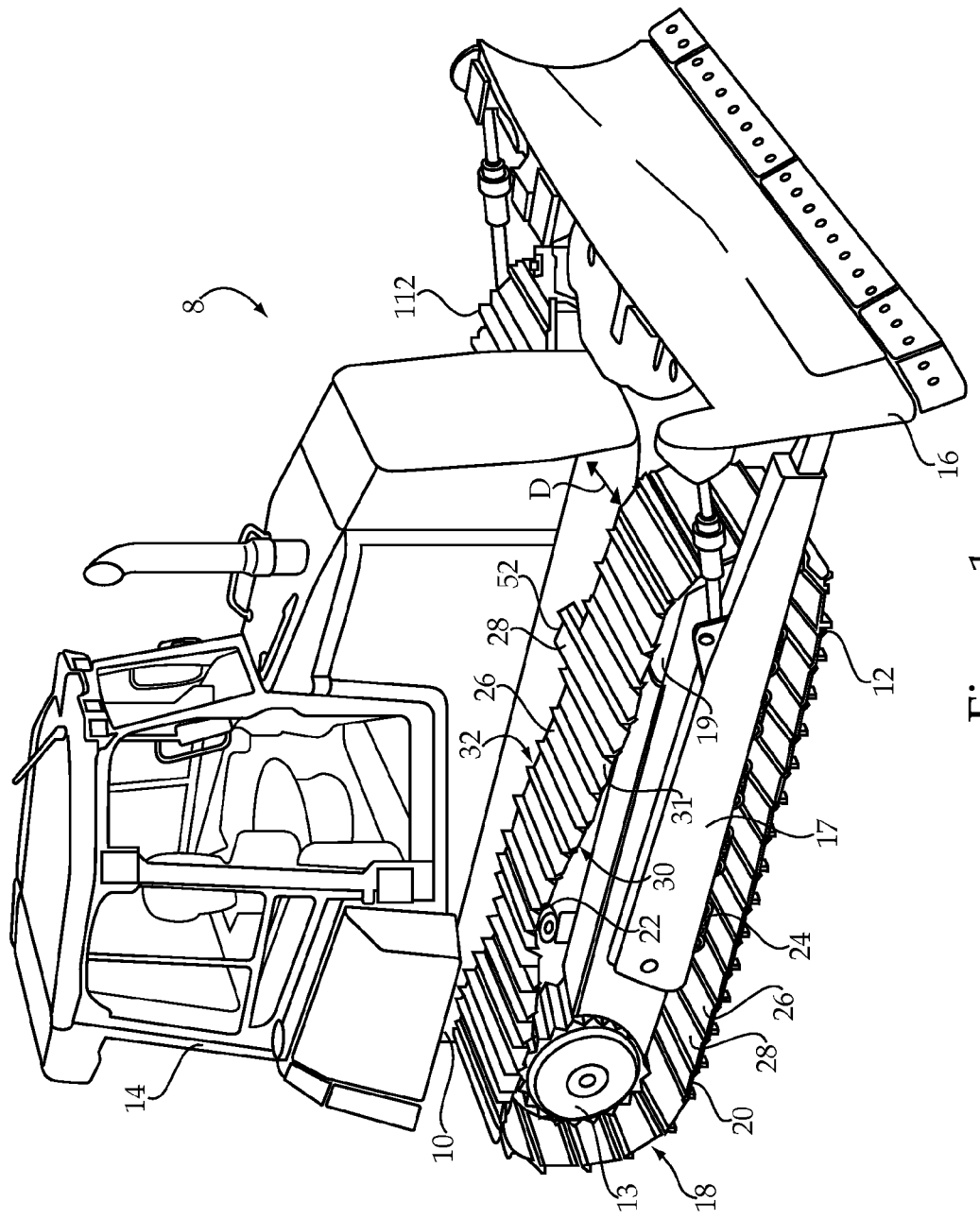
FIG. 1 is a perspective view of a machine according to one embodiment.

Referring to FIG. 1, there is shown a track-type machine 8 according to one embodiment. Machine 8 includes a main frame 10 having an operator cab 14 mounted thereon, and an implement 16. An undercarriage system 18 coupled with frame 10 includes a first ground engaging track 12 having a track chain 31 positioned at a first side of frame 10, and a second ground engaging track 112 positioned at an opposite side of frame 10. Machine 8 is shown in the context of a track-type tractor, of a type suitable for use in applications where traveling over or through, or distributing loose material is desired. Landfills and the like are expected to be one environment where machines according to the present disclosure will be implemented, however, the present disclosure is not thereby limited. Moreover, other track-type machines such as track loaders, excavators, and still others will fall within the scope of the present disclosure. As will be further apparent from the following description, machine 8 may be uniquely equipped for removing debris from a clearance between undercarriage system 18 and frame 10 during actuating tracks 12 and 112.

Undercarriage system 18 may include a drive sprocket 13, a track roller frame 20, having an elongate frame body 25 with front and back ends 21 and 23, respectively, and an idler 19 mounted to or otherwise coupled with front end 21 of track roller frame 20. In the embodiment shown, a support arm mechanism 17 for implement 16 extends between undercarriage system 18 and implement 16, at each side of machine 8. Those skilled in the art will be familiar with alternative implement types and mounting strategies. For that matter, machines are contemplated within the scope of the present disclosure which do not include an implement at all. Tracks 12 and 112 may be mirror images of one another, and the present description of features or functions of one of track 12 and track 112 should therefore be understood to similarly refer to the other of track 12 and track 112, except as where otherwise indicated. Track 12 may be supported by and contact one or more carrier rollers 22 mounted to track roller frame 20, and also a plurality of lower rollers 24 also mounted to track roller frame 20. Track 12 may further include a plurality of track shoes connectable via track links in an endless chain configuration extending about drive sprocket 13 and idler 19. The plurality of track shoes may include a set of identical standard track shoes 26, and one or more sweeping track shoes 28 coupled together to form track chain 31. In FIG. 1, a clearance distance D indicates a horizontal distance between an inboard track chain edge 32 and frame 10. An outboard track chain edge 30 is located opposite inboard track chain edge 32. In the illustrated embodiment, track chain 31 includes an oval chain configuration defining a generally oval track shape, as is known in the art. In other embodiments, track chain 31 might have a different configuration, such as a so called "high-drive" configuration where both front and back idlers and a drive sprocket are used.

As mentioned above, track 12 may include one or more sweeping track shoes 28, features and functions of which are further described below. Although a number of sweeping track shoes greater than two might be used without departing from the scope of the present disclosure, a total of one or two sweeping track shoes per track chain provides a practical implementation strategy. In the illustrated embodiment, two sweeping track shoes 28 are used and are positioned in track chain 31 approximately opposite one another. Accordingly, when one of sweeping track shoes 28 just comes into contact with idler 19 during activating track 12, the other sweeping track shoe 28 may be expected to be just coming into contact with drive sprocket 13. Track chain 31 may further be configured such that outboard chain edge 30 is substantially uniform. This means that outboard edges of all of the track shoes comprising track chain 31 may be approximately tangent to a single plane. In contrast, inboard track chain edge 32 may be non-uniform. In particular, each of standard track shoes 26 may be sized and arranged such that they are approximately tangent to the same plane at inboard track chain edge 32, but sweeping shoes 28 may be configured such that they jut outwardly of standard track shoes 26 in an inboard direction when connected together in the endless chain configuration as shown in FIG. 1. Each of sweeping track shoes 28 may further comprise an inboard sweeping edge 52 which comprises a segment of inboard track chain edge 32 and imparts the described non-uniformity thereto. Outward jutting of sweeping track shoes 28, in other words jutting from undercarriage system 18 towards frame 10, enables sweeping debris from the clearance between undercarriage system 18 and frame 10, as further described herein.

Figure 5:
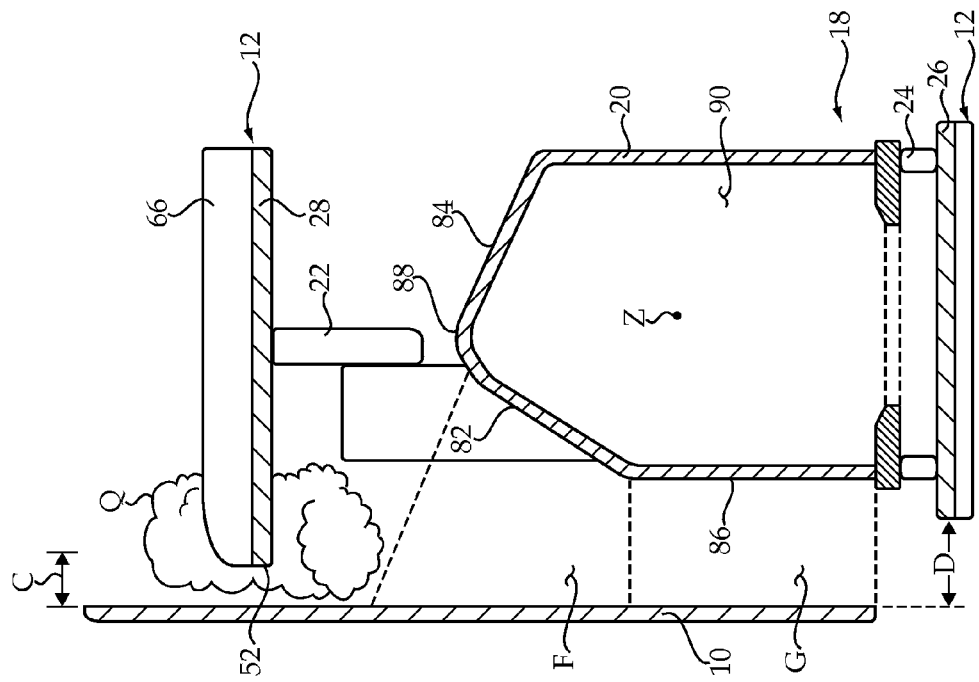
FIG. 5 is a sectioned diagrammatic view of a portion of the machine of FIG. 1.

Referring also now to FIG. 5, there is shown a sectioned view through a portion of machine 8 in a section plane passing vertically through one of sweeping track shoes 28, shown in contact with carrier roller 22, and also through one of standard track shoes 26, shown in contact with a lower roller 24. The section plane also passes through a portion of frame 10, and is oriented normal to a longitudinal axis Z of track roller frame 20 extending between front frame end 21 and back frame end 23. In one embodiment, track roller frame 20 may include a box frame such that body 25 defines a hollow interior 90, and also including a peaked upper surface profile defined by an inboard slope 82, an outboard slope 84, and a peak 88 transitioning with each of inboard slope 82 and outboard slope 84. Inboard slope 82 may be relatively steeper than outboard slope 84 relative to a vertical line normal to and passing through longitudinal axis Z. Clearance distance D is shown extending between the standard track shoe 26 and a plane defined by frame 10. It will thus be understood that frame 10 includes a main frame of machine 8, whereas track roller frame 20 includes one of two track roller frames which would be positioned at each side of main frame 10 and having a clearance therewith. The clearance between track roller frame 20 and frame 10 may define a funnel shape, having a throat segment shown generally via reference letter F between a dashed line extending between peak 88 and frame 10 and another dashed line extending between frame 10 and track roller frame 20 approximately at a point where inboard slope 82 transitions to a vertically oriented inboard side 86 of track roller frame 20. The funnel shape may further include a stem segment denoted generally via reference letter G. Also shown in FIG. 5 is a clearance C extending between inboard sweeping edge 52 of sweeping shoe 28. It may be noted that clearance C is less than clearance D. A piece of debris Q is also shown in FIG. 5. It may further be noted that the inward jutting character of sweeping track shoe 28 can be expected to enable sweeping edge 52 to collide with debris Q. As such, actuating track 12 can be expected to enable sweeping shoe 28 to pass horizontally through a portion of the clearance between undercarriage system 18 and 10 to push debris piece Q out from between undercarriage system 18 and frame 10. The teachings of the present disclosure might be applied to systems having different track roller frame configurations than that which is shown. It has been discovered, however, that one practical implementation of the use of one or more sweeping track shoes is the clearing of debris from machines in which a funnel shaped clearance such as that illustrated in FIG. 5 extends between a track roller frame and a main frame. In earlier systems, it is believed that the funnel shape contributed to debris becoming caught and packed within the clearance, requiring relatively laborious manual labor to remove.

Figure 2:
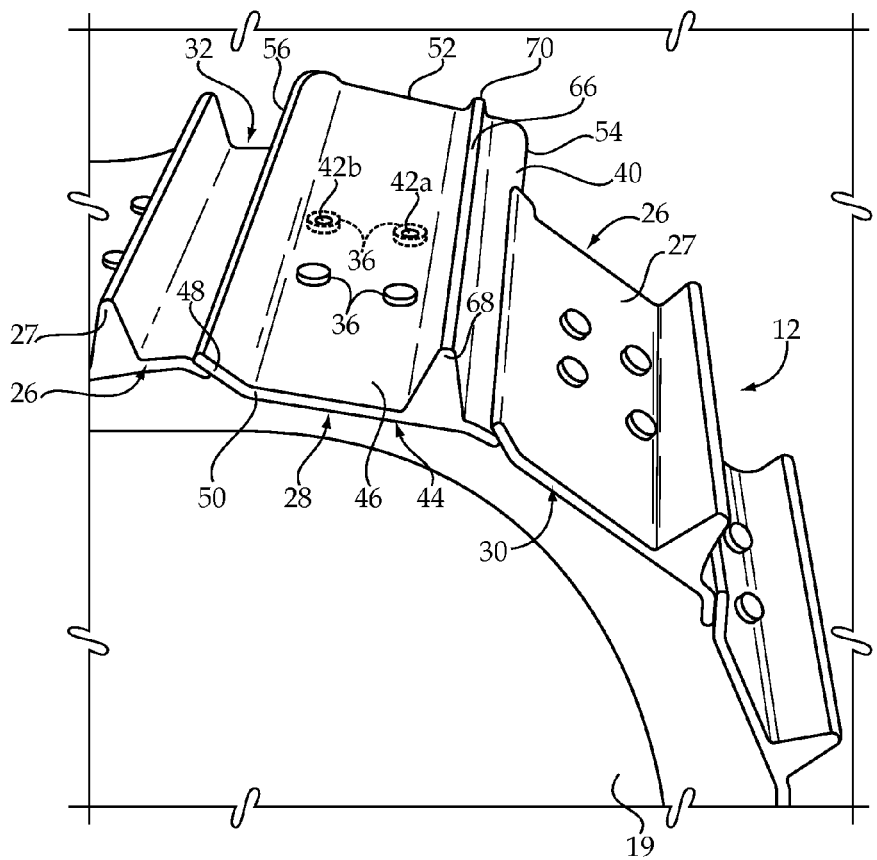
FIG. 2 is a perspective view of a portion of the machine of FIG. 1.

Referring now to FIG. 2, there is illustrated a portion of track 12 as it might appear where a sweeping shoe 28 has come into contact with idler 19. As discussed above, sweeping shoe 28 is configured to jut outwardly of standard track shoes 26 toward a main frame of the associated track-type machine. Apart from certain geometric attributes further described herein which enable sweeping shoe 28 to jut from standard track shoes 26 and thereby sweep debris, sweeping shoe 28 may otherwise function as an actual track shoe in a manner similar to standard shoes 26. Sweeping shoe 28 may thus be configured to swap in for any one of standard track shoes 26. To this end, sweeping shoe 28 may include a one-piece sweeping shoe body 40 having a plurality of bolting apertures formed therein, namely, a set of two forwardly positioned bolting apertures, one of which is shown and identified via reference numeral 42*a*, and a set of two rearwardly positioned bolting apertures 42*b*. Bolts 36 may pass through bolting apertures 42*a* and 42*b* to connect with track links in a conventional manner.

Bolting apertures 42*a* and 42*b* may communicate between an upper shoe surface 44 and a ground contacting shoe surface 46. It may also be noted from FIG. 2 that "upper" surface 44 is presently actually positioned below ground contacting surface 46, to contact components of undercarriage system 18, while ground contacting surface 46 is exposed. Shoe body 40 may further include an outer perimeter 48 defining a sweeping shoe footprint, whereas each of standard shoes 26 may include a shoe body 27 defining a standard shoe footprint. The standard shoe footprint may be a relatively narrow footprint whereas the sweeping shoe footprint may be a relatively wide footprint, as further described herein. Shoe body 40 may further include an outboard edge 50 positioned opposite inboard sweeping edge 52, as well as a leading edge 54 and a trailing edge 56. A grouser 68 extends from, or is part of, shoe body 40, and may include a full-width grouser extending from outboard edge 50 to inboard edge 52. An outboard grouser edge is shown via reference numeral 68, and an inboard grouser edge is shown via reference numeral 70. In the embodiment shown, grouser 66 is formed integrally with shoe body 40, but might alternatively include a bolt-on grouser or the like. It may thus also be understood that grouser 66 includes a portion of ground contacting surface 46.

Figure 3:
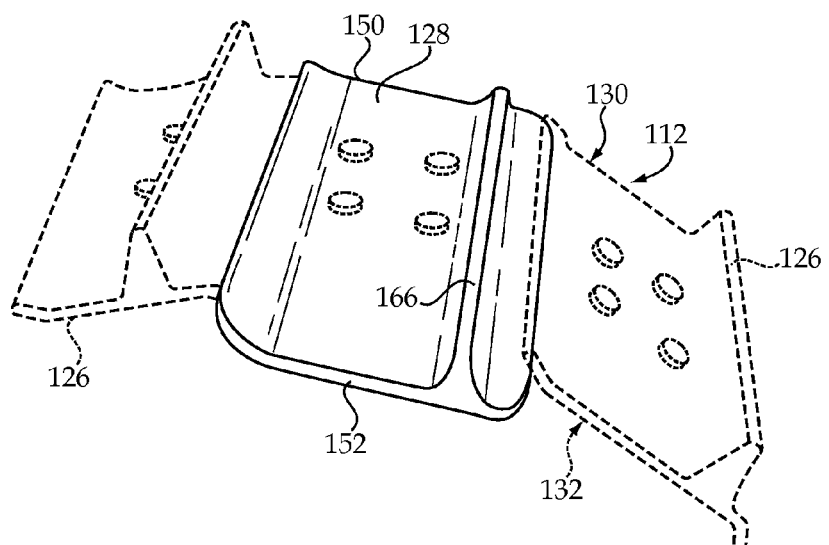
FIG. 3 is a perspective view, partially in phantom, of a portion of the machine of FIG. 1.

Referring to FIG. 3, there is shown a sweeping track shoe 128 similar to track shoe 28 described above, but configured for use with ground engaging track 112. Sweeping shoe 128 may define a sweeping shoe footprint, and be coupled with a plurality of standard shoes 126 each defining a standard shoe footprint, such that an inboard sweeping edge 152 of sweeping shoe 128 juts outwardly of standard shoes 126 toward frame 10 in a manner similar to that of sweeping shoe 28. It will further be understood that sweeping shoe 128 may be identical to sweeping shoe 28, but for being a mirror image thereof. Inboard sweeping edge 152 may thus jut outwardly and comprise a segment of an inboard track chain edge 132, whereas an outboard edge 150 of sweeping shoe 128 may substantially align with outboard edges of standard shoes 126 at an outboard track chain edge 130.

Figure 4:
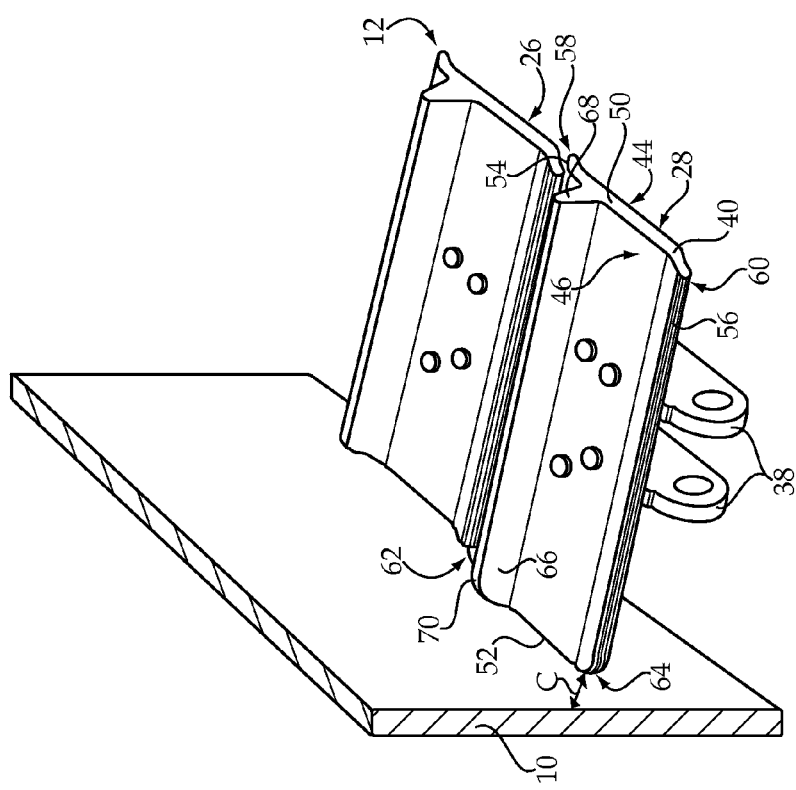
FIG. 4 is a pictorial view of a portion of the machine of FIG. 1.

Referring now to FIG. 4, there is shown a different view of sweeping shoe 28 coupled with a standard track shoe 26 and positioned adjacent, but spaced from frame 10. A set of track links 38 are coupled with sweeping shoe 28 and with standard shoe 26 in a conventional manner. In the illustrated embodiment, links 38 include straight links, such that a set of straight outboard links are positioned in an alternating arrangement with a set of straight inboard links. In other embodiments, S-shaped links or still another link strategy such as links formed integrally with track shoe bodies might be used. It may be noted that shoe body 40 includes a planate middle portion, such that each of upper surface 44 and ground contacting surface 46 defines a plane. In the FIG. 4 illustration, trailing edge 56 will be understood to curve upwardly from ground contacting surface 46, whereas leading edge 54 will be understood to curve downwardly from surface 46. If shoe body 40 is flipped over, such as it might appear when contacting the ground, leading edge 54 would be understood to curve upwardly from surface 44, whereas trailing edge 56 would be understood to curve downwardly from surface 44. Standard shoe 26 may include similarly curved leading and trailing edges. Also illustrated in FIG. 4 are certain geometric features of sweeping shoe 28 which differ from features of standard shoe 26. In particular, it may be noted that a first corner 62, transitioning between inboard sweeping edge 52 and leading edge 54, is rounded. Similarly, another corner 64 transitioning between inboard sweeping edge 52 and trailing edge 56 is also rounded. Inboard edge 70 of grouser 66 is also rounded. A corner 58 transitioning between leading edge 54 and outboard edge 50 is not rounded, nor is a corner 60 transitioning between outboard edge 50 and trailing edge 56. Similarly, outboard grouser edge 68 is not rounded. It should be appreciated that the terms "rounded" and "not rounded" are used herein in a relative sense. Thus, corners 62 and 64, and grouser edge 70 may be rounded or gradually profiled, whereas corners 58 and 60 and outboard grouser edge 68, may be non-rounded or abruptly profiled. Still another way to understand these geometric features of shoe body 40, is that outboard edge 50 may include a standard shoe profile which is similar or identical to an outboard profile of standard shoes 26, whereas inboard sweeping edge 52 may include an anti-snagging profile. It has been discovered that forming inboard edge 52 with an anti-snagging profile can assist in reducing the tendency for sweeping shoe 28 to catch debris and drag debris into the clearance between undercarriage system 18 and frame 10. The terms "anti-snagging" and "standard" are also used herein in a relative sense in connection with edges 50 and 52. It should thus be understood that a track shoe having inboard and outboard edges which are identical but for being mirror images of one another would not likely be fairly understood to include each of a standard profile and an anti-snagging profile. Further, a track shoe having any features on an inboard edge which are sharper than corresponding features on an outboard edge would also not likely be fairly understood as having an anti-snagging profile. For that matter, a track shoe in which features on an inboard edge are relatively more abruptly profiled or sharper than corresponding features on an outboard edge would not likely be fairly understood to include an inboard sweeping edge at all.

Figure 6:
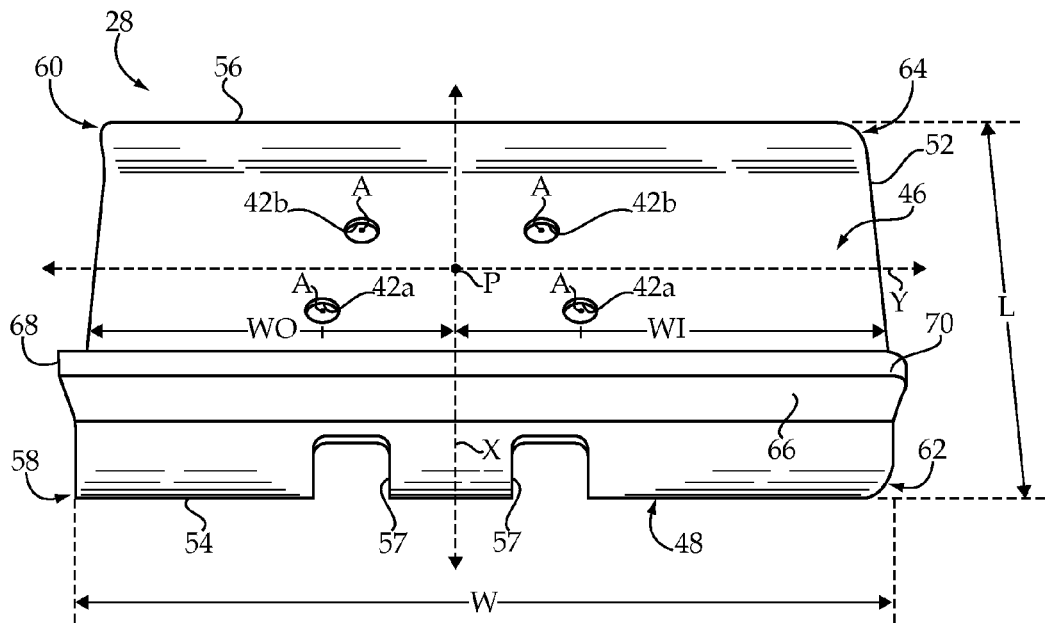
FIG. 6 is a diagrammatic view of a sweeping track shoe according to one embodiment.

Referring now to FIG. 6, there is shown sweeping shoe 28 and illustrating certain additional geometric attributes thereof. It may be noted that a set of cutouts 57 are formed in leading edge 54 for purposes well known in the art. It may also be noted that bolting apertures 42a, which may be understood as adjacent leading edge 54, are widely spaced from one another. Bolting apertures 42b which are adjacent trailing edge 56 are closely spaced from one another. Bolting apertures 42a and 42b may further be understood to define a geometric center point P, a minor shoe axis X intersecting leading edge 54 and trailing edge 56, and a major shoe axis Y intersecting outboard edge 50 and inboard sweeping edge 52. Point P includes a geometric center point defined by apertures 42a and 42b, and may not be the same as a geometric center point of shoe body 40. Axes X and Y may be oriented normal to one another and intersect at point P. Bolting apertures 42a and 42b may further be understood to be in a directional link bolting pattern which defines minor axis X and major axis Y. In the illustrated embodiment, the link bolting pattern is trapezoidal. The term "directional link bolting pattern" may be understood to mean that bolting apertures 42a and 42b define no two identical geometric patterns in a given coordinate plane. Thus, if shoe body 40 were rotated 360° about an axis extending through point P and normal to surface 46, the pattern defined by link bolting apertures 42a and 42b would be different at each degree of rotation.

The link bolting pattern depicted in FIG. 6 may also be understood to be symmetric about minor shoe axis X, and the sweeping shoe footprint defined by outer perimeter 48 may be understood to be asymmetric about minor shoe axis X. The asymmetry of the sweeping shoe footprint may take a number of different forms. As explained above, shapes of corners 58 and 60 may not be mirror images of the shapes of corners 62 and 64, an example of shape asymmetry. The sweeping shoe footprint may additionally or alternatively be dimensionally asymmetric about minor shoe axis X. Shoe body 40 may include a length dimension L parallel minor shoe axis X, and a width dimension W parallel major shoe axis Y which is greater than length dimension L. Because of dimensional asymmetry in shoe body 40, and hence the sweeping shoe footprint, about minor shoe axis X, a first distance from minor shoe axis X to outboard edge 50 may be less than a second distance from minor shoe axis X to inboard sweeping edge 52.

In FIG. 6, the first distance from minor shoe axis X to outboard edge 50 is shown as WO, whereas the second distance from minor shoe axis X to inboard sweeping edge 52 is shown as WI. It will be readily understood that a sum of distance WO and distance WI defines width W. In one embodiment, width W may be equal to between about 500 millimeters and about 1000 millimeters. As used herein, the term "about" may be understood in the context of a number of significant digits. Thus, "about 500 millimeters" means between 450 and 549 millimeters. "about 500.5 millimeters" would mean between 500.0 millimeters and 500.9 millimeters, and so on. Length L may be equal to between about 200 millimeters and about 300 millimeters. Distance WO may further be equal to between about 330 millimeters and about 460 millimeters, and distance WI may be equal to between about 370 millimeters and about 500 millimeters. Each of apertures 42a and 42b may define a center axis A. The distance from the center axis A defined by the one of forward apertures 42a closest to outboard edge 50 may be equal to about 200 millimeters in one embodiment, and a correspondingly defined distance from the center axis A of the one of forward apertures 42a closest to inboard sweeping edge 52 may be equal to about 280 millimeters. Yet another way to characterize the dimensional asymmetry of the sweeping shoe footprint is by way of percentages. In certain embodiments, distance WI may be equal to about 105% or greater of distance WO. Distance WI may further be equal to between about 108% and about 113% of distance WO, and more particularly between about 108.3% and about 112.5% of distance WO.

A number of different factors will bear on selection of suitable dimensions of a sweeping track shoe according to the present disclosure. On the one hand, it will typically be necessary to provide a sweeping track shoe which juts outwardly of standard track shoes sufficiently that the inboard sweeping edge thereof can successfully impinge upon and sweep debris. On the other hand, since a ground engaging track can be expected, and indeed is typically designed, to move relative to a main frame of the associated machine during operation as obstructions such as rocks and other hard debris materials are encountered, it will typically be desirable to avoid designing the sweeping track shoe such that it can readily contact the main frame of the machine as the track moves side to side. Track type machines can be equipped with a range of standard shoe sizes, such as relatively more narrow standard shoes for higher ground pressure applications, and relatively wider standard shoes for lower ground pressure applications. In addition, the gage of a track-type machine, which is a measurement between the center of one track on a first side of the machine to a center of the other track on the opposite side of the machine, can also vary. Accordingly, it will be appreciated that a balance may be struck among these various factors such that a sweeping track shoe can successfully clear debris, but not jut outwardly so far that collision with the main frame or other components is a significant risk. In this vein, the present disclosure contemplates certain particular but not limiting practical implementation strategies.

In one illustrative example, a track having a gage of about 1880 millimeters includes standard shoes having a shoe width between about 510 millimeters and about 610 millimeters. This example track may include a shoe pitch of about 203 millimeters, which is a measurement from the center of one shoe to the center of a next adjacent shoe. In such an embodiment, a sweeping track shoe may have a first dimension analogous to distance WO which is equal to between about 255 millimeters and about 305 millimeters, and a second dimension analogous to distance WI which may be equal to about 343 millimeters. In a second illustrative example, a track having a gage of about 2290 millimeters and a shoe pitch of about 203 millimeters includes standard shoe widths between about 610 millimeters and about 915 millimeters, a sweeping shoe dimension WO equal to between about 305 millimeters and about 458 millimeters, and a sweeping shoe dimension WI equal to about 496 millimeters.

In a third example, a track gage may be equal to about 1980 millimeters and a shoe pitch may be equal to about 216 millimeters, whereas standard shoe width may be between about 560 millimeters and about 660 millimeters. In the third example, WO may be equal to between about 280 millimeters and about 330 millimeters, and WI may be equal to about 368 millimeters. In the fourth example, track gage may be equal to about 2240 millimeters, shoe pitch may be equal to about 216 millimeters, and standard shoe width may be between about 660 millimeters and about 915 millimeters. In the fourth example, WO may be equal to between about 330 millimeters and about 456 millimeters, and WI may be equal to about 496 millimeters. In a fifth example, track gage is equal to about 1980 millimeters, shoe pitch is equal to about 216 millimeters, and standard shoe width is equal to between about 610 millimeters and about 660 millimeters. In the fifth example, WO is equal to between about 305 millimeters and about 330 millimeters, and WI is equal to about 368 millimeters. In a sixth example, track gage is equal to about 2286 millimeters and shoe pitch is equal to about 216 millimeters, whereas standard shoe width is equal to between about 610 millimeters and about 915 millimeters. In the sixth example, WO is equal to between about 305 millimeters and about 460 millimeters, and WI is equal to about 496 millimeters.

In a seventh example embodiment, track gage is equal to about 2080 millimeters, shoe pitch is equal to about 216 millimeters, and standard shoe width is equal to between about 560 millimeters and about 710 millimeters. In the seventh example, WO is equal to between about 280 millimeters and about 355 millimeters, and WI is equal to about 393 millimeters. In an eighth example, track gage is equal to about 2340 millimeters, shoe pitch is equal to about 216 millimeters, and standard shoe width is equal to between about 710 millimeters and about 965 millimeters. In the eighth example, WO is equal to between about 355 millimeters and about 483 millimeters, and WI is equal to about 521 millimeters. In the ninth example embodiment, track gage is equal to about 2250 millimeters, shoe pitch is equal to about 240 millimeters, and standard shoe width is equal to between about 560 millimeters and about 760 millimeters. In the ninth example embodiment, WO is equal to between about 280 millimeters and about 380 millimeters, and WI is equal to about 418 millimeters.

Figure 7:
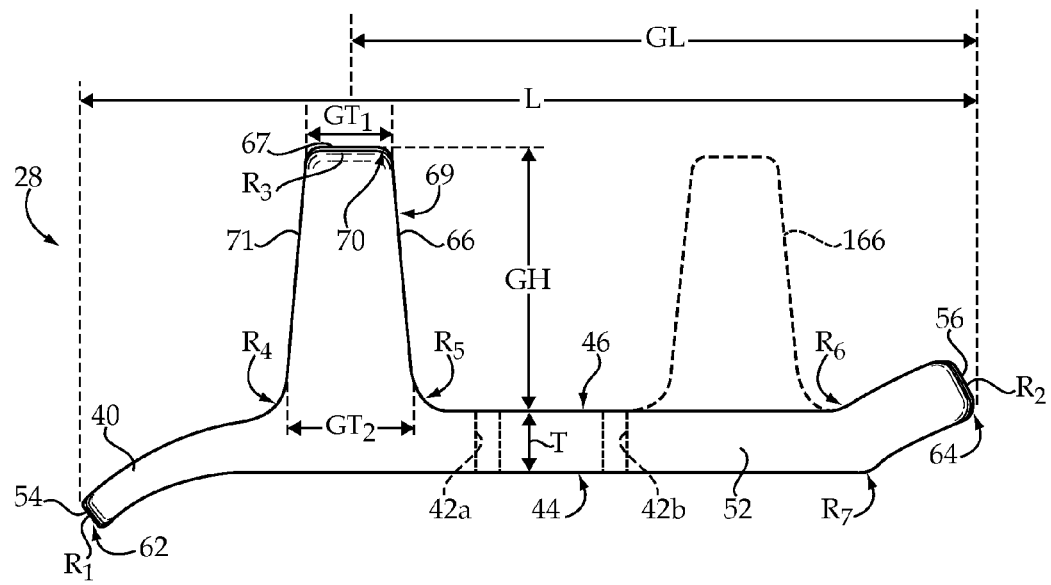
FIG. 7 is a side diagrammatic view of the sweeping track shoe of FIG. 6.

Referring now to FIG. 7, there is shown a side view of sweeping track shoe 28 viewing inboard sweeping edge 52 edge-on, and illustrating still further geometric attributes. In FIG. 7, a second grouser is illustrated in phantom and identified via reference numeral 166. Grouser 66 is also shown, and includes a grouser trailing surface 69 and a grouser leading surface 71, as well as a grouser top surface 67 extending between trailing surface 69 and leading surface 71. A fore-to-aft thickness of grouser 66, approximately at top surface 67 and shown via reference letter GT, may be equal to between about 10 millimeters and about 30 millimeters. Another dimension $GT_2$ extends between leading and trailing grouser surfaces 71 and 69 adjacent to surface 46 and, may be equal to between about 20 millimeters and about 50 millimeters. A shoe thickness T extending between surface 44 and 46 may be equal to between about 10 millimeters and about 20 millimeters. Yet another dimension GL extends from an outermost point on trailing edge 56 to approximately a center of grouser 66, half-way between surface 69 and surface 71, and may be equal to between about 170 millimeters and about 200 millimeters. A grouser height dimension GH may be equal to between about 60 millimeters and about 90 millimeters.

Also shown in FIG. 7 are a plurality of different radiuses associated with transitions between surfaces of shoe body 40. In particular, a first radius $R_1$ represents a radius of curvature defined by corner 62. A second radius $R_2$ represents a radius of curvature defined by corner 64, and a third radius $R_3$ represents a radius of curvature defined by inboard grouser edge 70. A radius $R_4$ represents a radius of curvature at a transition between leading edge 54 and grouser leading surface 71, whereas another radius $R_5$ represents a radius of curvature at a transition between grouser trailing surface 69 and ground contacting surface 46. A radius of curvature $R_6$ represents a radius of curvature at a transition between ground contacting surface 46 and trailing edge 56, whereas another radius $R_7$ represents a radius of curvature at a transition between surface 44 and trailing edge 56. Radiuses $R_1$, $R_2$, and $R_3$ may include relatively larger radiuses, whereas radiuses $R_4$, $R_5$, $R_6$ and $R_7$ may be relatively smaller radiuses. In one embodiment, radiuses $R_1$, $R_2$, and $R_3$ may be approximately equal. Among radiuses $R_4$-$R_7$, radiuses $R_4$ and $R_5$ may be larger than radiuses $R_6$ and $R_7$, which may be approximately equal.

Figure 8:
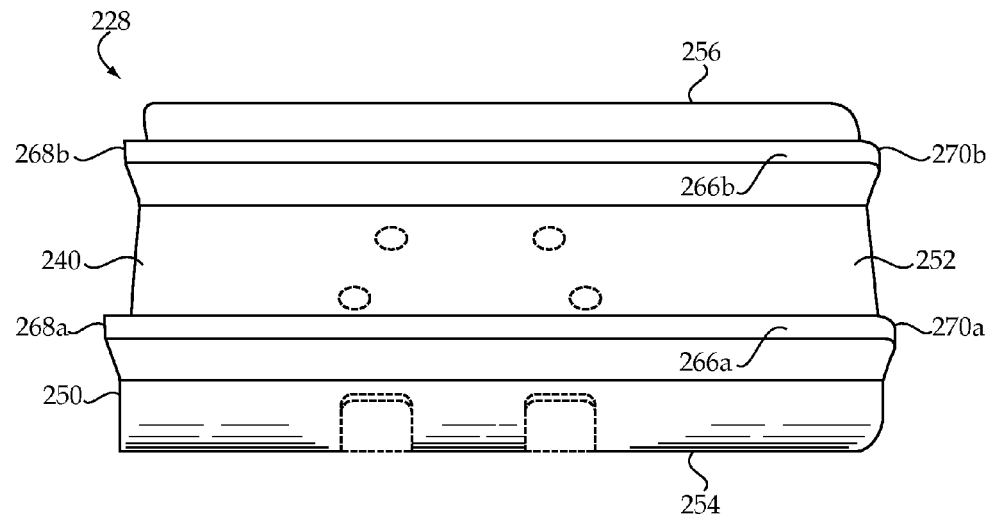
FIG. 8 is a diagrammatic view of a sweeping track shoe according to another embodiment.

Turning now to FIG. 8, there is shown a sweeping track shoe 228 according to another embodiment. Sweeping track shoe 228 may include a one-piece shoe body 240 having a leading edge 254, a trailing edge 256, and each of an outboard edge 250 and an inboard sweeping edge 252 extending from leading edge 254 to trailing edge 256. In contrast to other embodiments described herein, sweeping shoe 228 may include a double grouser sweeping shoe having a leading grouser 266a which includes an outboard grouser edge 268a and a rounded inboard grouser edge 270a, and a trailing grouser 266b which includes an outboard grouser edge 268b and another rounded inboard grouser edge 270b. Inboard sweeping edge 252 may be configured analogously to other embodiments described herein such that it defines an anti-snagging profile.

Figure 9:
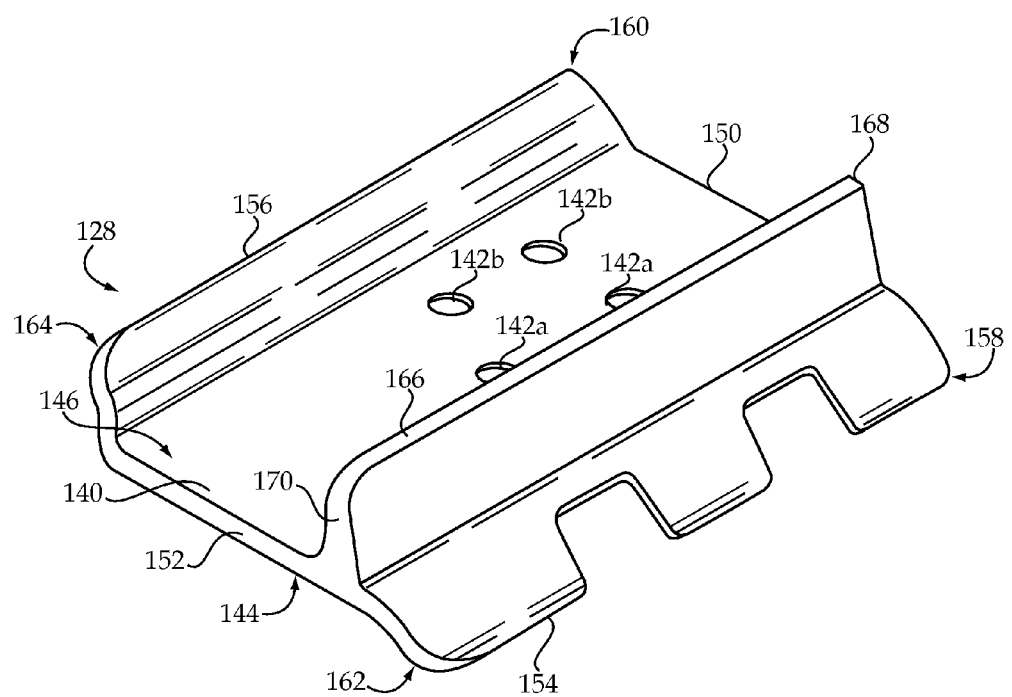
FIG. 9 is an isometric view of a sweeping track shoe according to another embodiment.

Referring to FIG. 9, there is shown sweeping shoe 128. It will be recalled that sweeping shoe 128 may be substantially identical to sweeping shoe 28 but for being a mirror image thereof. Another way to understand this distinction is that sweeping shoe 128 may be a left-handed sweeping shoe configured for use with left track 112 in machine 8, whereas sweeping shoe 28 may be a right-handed sweeping shoe configured for use with right track 12. Sweeping shoe 128 may include a one-piece shoe body 140 having leading and trailing edges 154 and 156, respectively, an outboard edge 150 extending from leading edge 154 to trailing edge 156, and an inboard sweeping edge 152 also extending from leading edge 154 to trailing edge 156. A grouser 166 is shown and includes an outboard grouser edge 168 and a rounded inboard grouser edge 170. Relatively abruptly profiled corners 158 and 160 transition between outboard edge 150 and leading edge 154 and trailing edge 156, respectively. Relatively gradually profiled corners 162 and 164 are positioned opposite abruptly profiled corners 158 and 160, such that inboard sweeping edge 152 defines an anti-snagging profile. Bolting apertures 142a and 142b, including a total of four bolting apertures, communicate between upper surface 144 and ground contacting surface 146.

Figure 10:
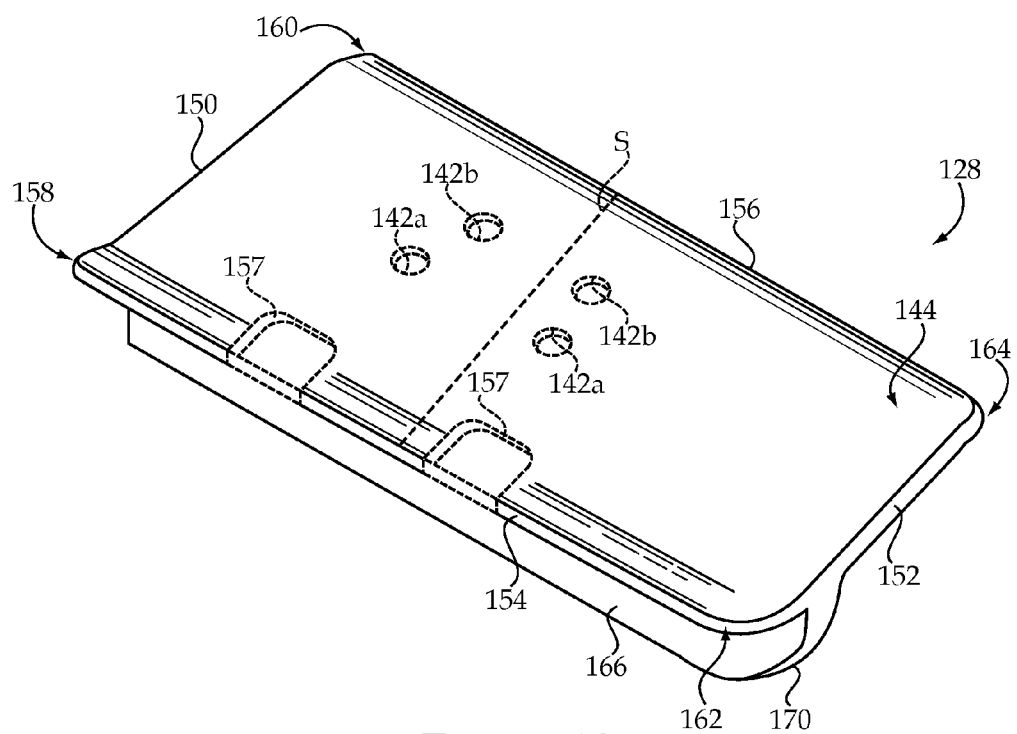
FIG. 10 is an isometric view of a sweeping track shoe according to one embodiment.
Figure 11:
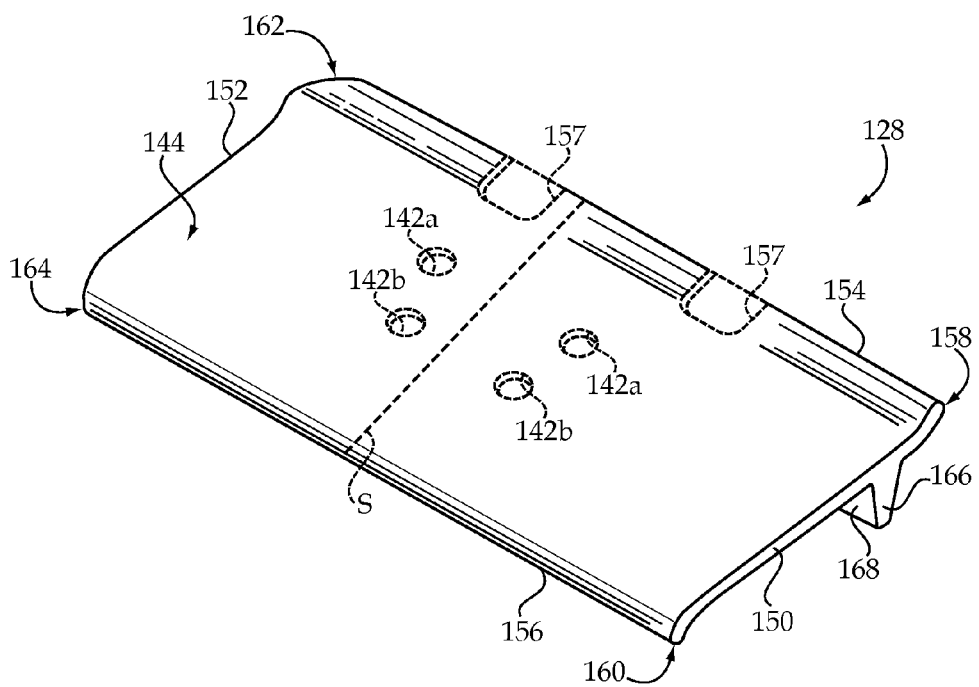
FIG. 11 is an isometric view of the sweeping track shoe of FIG. 10, rotated 180° from the view shown in FIG. 10.

Referring now to FIGS. 10 and 11, there are shown perspective views of sweeping track shoe 128, illustrating inboard sweeping edge 152 and outboard edge 150, respectively. It will be recalled that trailing edge 156 may curve downwardly relative to upper shoe surface 144, whereas leading edge 154 may curve upwardly relative to surface 144. In one practical implementation strategy, surface 144 may be moderately concave, however, the degree of concavity will typically be mild enough that it is not readily illustrated in views such as those of FIGS. 10 and 11. Also shown in FIGS. 10 and 11 are bolting apertures 142a and 142b, as well as cutouts 157, all in phantom. Sweeping track shoes are contemplated within the context of the present disclosure which do not include cutouts such as cutouts 157 at all, or where the cutouts are positioned at locations different from those shown. Each of FIGS. 10 and 11 further illustrates a line S which might be understood as a geometric centerline halfway between outboard edge 150 and inboard sweeping edge 152. It will be understood that the geometric centerline S is different from the minor shoe axis discussed above, or at least may be different from the minor shoe axis in certain embodiments. Bolting apertures 142a and 142b may be positioned asymmetrically about the geometric centerline S. Cutouts 157 may also be positioned asymmetrically about geometric centerline S.

Each of sweeping shoes 28, 128, and 228 are illustrated herein as offset shoes, in which inboard sweeping edges 52, 152 and 252 are positioned relatively further from the corresponding geometric centerline than the outboard edge 50, 150, 250. The present disclosure is not limited to offset designs, however. Those skilled in the art will be familiar with standard track shoe designs similar to those illustrated herein where inboard and outboard edges of the standard track shoes are spaced equidistant from a geometric centerline of the track shoe. Those skilled in the art will also be familiar with so called low ground pressure track shoes in which inboard and outboard edges are not positioned equidistant from the geometric centerline. Thus, standard track shoes may commonly have either of an offset design, or a non-offset design, and the present disclosure may find application to systems using either type of standard track shoes. One practical implementation strategy contemplates using offset sweeping track shoes with non-offset standard track shoes. Similarly, for systems using offset standard track shoes, non-offset sweeping track shoes might be used. Another way to understand this general strategy is that dimensionally symmetric sweeping track shoes might be used with dimensionally asymmetric standard track shoes, and dimensionally asymmetric sweeping track shoes might be used with dimensionally symmetric standard track shoes.

INDUSTRIAL APPLICABILITY

As alluded to above, sweeping track shoes 28, 128, 228 may be swapped in for standard track shoes in an existing ground engaging track system to retrofit a machine. It is contemplated that such retrofitting may take place without the need for breaking the subject track. Since the track links of a machine track will typically be connected to one another, in at least certain instances it may be possible to simply remove the bolts holding one standard track shoe in place, swap the standard track shoe with a sweeping track shoe, and bolt the sweeping track shoe into the track.

The present disclosure is contemplated to improve over conventional debris removal or avoidance strategies. The known strategies discussed above which relate to crushing debris materials, or clearing debris from amongst components of the track do little, if anything, to ameliorate debris packing between an undercarriage system and main frame. Striker bars and the like can assist in knocking off debris actually snagged on or adhered to the track, but do nothing for materials once trapped between the undercarriage system and main frame. Shielding and the like suffers from similar shortcomings. The present disclosure provides an altogether new strategy contemplated to avoid much of the previously required manual labor involved in cleaning potentially damaging and otherwise objectionable debris materials from between and among components of track-type machines.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A sweeping track shoe for an undercarriage system in a track-type machine, where the undercarriage system includes a track roller frame and a ground engaging track having a plurality of standard track shoes defining standard shoe footprints, and the undercarriage system is configured to couple with a main frame of the track-type machine such that a clearance extends between the undercarriage system and the main frame, the sweeping track shoe comprising:

a one-piece sweeping shoe body having bolting apertures formed therein and communicating between an upper shoe surface and a ground contacting shoe surface, and an outer perimeter defining a sweeping shoe footprint, the bolting apertures being arranged in a directional link bolting pattern defining a minor shoe axis and a major shoe axis; and the sweeping shoe body further having an outboard edge with a standard profile, an inboard sweeping edge with an anti-snagging profile, a leading edge and a trailing edge, wherein the outboard edge is positioned at a first distance from the minor shoe axis and the inboard sweeping edge is positioned at a second distance from the minor shoe axis which is greater than the first distance, and wherein the sweeping track shoe is connectable with the standard track shoes in an endless chain configuration such that the sweeping track shoe juts outwardly of the standard track shoes in an inboard direction for sweeping debris from the clearance during actuating the track.

2. The sweeping track shoe of claim 1 wherein the second distance is equal to at least about 105% of the first distance.

3. The sweeping track shoe of claim 2 wherein the second distance is equal to between about 108% and about 113% of the first distance.

4. The sweeping track shoe of claim 2 wherein the sweeping shoe body includes abruptly profiled outboard shoe corners, and gradually profiled inboard shoe corners.

5. The sweeping track shoe of claim 4 wherein the upper shoe surface includes a planate shoe surface, and the leading edge curves upwardly from the planate shoe surface and the trailing edge curves downwardly from the planate shoe surface.

6. The sweeping track shoe of claim 5 further including a grouser extending from the inboard sweeping edge to the outboard edge, and including a portion of the ground contacting shoe surface.

7. The sweeping track shoe of claim 2 wherein a sum of the first distance and the second distance defines a width of the sweeping track shoe and is equal to between about 500 millimeters and about 1000 millimeters, and wherein a length of the sweeping track shoe is equal to between about 200 millimeters and about 300 millimeters.

8. The sweeping track shoe of claim 7 wherein the first distance is equal to between about 330 millimeters and about 460 millimeters, and the second distance is equal to between about 370 millimeters and about 500 millimeters, and wherein the sweeping track shoe includes a shoe thickness between the upper shoe surface and the ground contacting shoe surface which is equal to between about 10 millimeters and about 20 millimeters.

9. A sweeping track shoe for an undercarriage system in a track-type machine, where the undercarriage system includes a track roller frame and a ground engaging track having a plurality of standard track shoes defining standard shoe footprints, and the undercarriage system is configured to couple with a main frame of the track-type machine such that a clearance extends between the undercarriage system and the main frame, the sweeping track shoe comprising:

a one-piece sweeping shoe body having an outboard edge, an inboard sweeping edge, a leading edge and a trailing edge, the sweeping shoe body further having bolting apertures formed therein and communicating between an upper shoe surface and a ground contacting shoe surface;

the sweeping shoe body further having a grouser which includes a portion of the ground contacting shoe surface and extends from the outboard edge to the inboard sweeping edge, and an outer perimeter defining a sweeping shoe footprint;

wherein the bolting apertures are arranged in a directional link bolting pattern defining a minor shoe axis intersecting the leading and trailing edges, and a major shoe axis intersecting the outboard and inboard edges; and wherein the link bolting pattern is symmetric about the minor shoe axis, the outer perimeter is more abruptly profiled on the outboard edge and less abruptly profiled on the inboard sweeping edge such that the sweeping shoe footprint is asymmetric about the minor shoe axis, and the sweeping track shoe is connectable with the standard track shoes in an endless chain configuration such that the sweeping track shoe juts outwardly of the standard track shoes in an inboard direction for sweeping debris from the clearance during actuating the track.

10. The sweeping track shoe of claim 9 wherein the sweeping shoe body includes a length dimension parallel the minor shoe axis and a width dimension parallel the major shoe axis which is greater than the length dimension, and wherein the sweeping shoe footprint is dimensionally asymmetric about the minor shoe axis.

11. The sweeping track shoe of claim 9 wherein a first distance extends from the minor axis to the outboard edge, and a second distance extends from the minor axis to the inboard sweeping edge, and wherein the second distance is equal to at least about 105% of the first distance.

12. The sweeping track shoe of claim 11 wherein the second distance is equal to between about 108% and about 113% of the first distance.

13. The sweeping track shoe of claim 11 wherein the sweeping shoe footprint includes a shape which is asymmetric about the minor shoe axis.

14. The sweeping track shoe of claim 13 wherein the sweeping shoe body includes a standard outboard profile, and an anti-snagging inboard profile.

15. A sweeping track shoe for an undercarriage system in a track-type machine, comprising:
 a one-piece sweeping shoe body having a planate upper shoe surface, a ground contacting shoe surface, and an outer shoe perimeter defining a sweeping shoe footprint, the sweeping shoe body further having a leading edge curving upwardly from the upper shoe surface, a trailing edge curving downwardly from the upper shoe surface, and a full width grouser including a portion of the ground contacting shoe surface; and
 the sweeping shoe body further having an outboard edge and an inboard edge, extending between the leading and trailing edges, the outboard edge defining a standard edge profile; and
 the sweeping shoe body further having abruptly profiled corners transitioning between the outboard edge and the leading and trailing edges, and gradually profiled corners transitioning between the inboard edge and the leading and trailing edges, such that the inboard edge defines an anti-snagging edge profile and is configured for sweeping debris from a clearance between the undercarriage system and a main frame of the track-type machine.

16. The sweeping track shoe of claim 15 wherein the sweeping shoe body includes bolting apertures formed therein, the bolting apertures being arranged in a directional link bolting pattern and communicating between the upper shoe surface and the ground contacting shoe surface.

17. The sweeping track shoe of claim 16 wherein:
 the bolting apertures define a minor shoe axis intersecting the leading and trailing edges, and a major shoe axis oriented normal to the minor shoe axis and intersecting the outboard and inboard edges;
 the directional link bolting pattern is symmetric about the minor shoe axis; and
 the sweeping shoe footprint is dimensionally asymmetric about the minor shoe axis such that a first distance from the minor shoe axis to the outboard edge is less than a second distance from the minor shoe axis to the inboard edge.

18. The sweeping track shoe of claim 17 wherein a first and a second of the bolting apertures are widely spaced from one another and positioned adjacent the leading edge, and a third and a fourth of the bolting apertures are closely spaced from one another and positioned adjacent the trailing edge.

19. The sweeping track shoe of claim 18 wherein the bolting apertures include a total of four bolting apertures each defining a center axis, wherein the widely spaced apertures include an inboard aperture and an outboard aperture, and wherein a distance from the center axis of the outboard aperture to the outboard edge is equal to about 200 millimeters, and a distance from the center axis of the inboard aperture to the inboard edge is equal to about 280 millimeters.

* * * * *